US012444999B2

(12) United States Patent
Nie et al.

(10) Patent No.: US 12,444,999 B2
(45) Date of Patent: Oct. 14, 2025

(54) BRUSHLESS HIGH SPEED MOTOR

(71) Applicant: Shenzhen Kelier Intelligent Control Technology Co., Ltd., Shenzhen (CN)

(72) Inventors: Pengju Nie, Shenzhen (CN); Hui Liu, Shenzhen (CN); Yongmin Zhu, Shenzhen (CN); Gang Xu, Shenzhen (CN)

(73) Assignee: Shenzhen Keller Intelligent Control Technology Co., Ltd., Shenzhen (CN)

( * ) Notice: Subject to any disclaimer, the term of this patent is extended or adjusted under 35 U.S.C. 154(b) by 237 days.

(21) Appl. No.: 18/315,783

(22) Filed: May 11, 2023

(65) Prior Publication Data

US 2024/0136869 A1 Apr. 25, 2024
US 2024/0235288 A9 Jul. 11, 2024

(30) Foreign Application Priority Data

Oct. 21, 2022 (CN) .......................... 202222779006.6

(51) Int. Cl.
*H02K 1/18* (2006.01)
*H02K 5/167* (2006.01)
*H02K 5/20* (2006.01)

(52) U.S. Cl.
CPC ............. *H02K 1/187* (2013.01); *H02K 5/167* (2013.01); *H02K 5/20* (2013.01)

(58) Field of Classification Search
CPC ........ H02K 1/187; H02K 11/33; H02K 21/16; H02K 3/522; H02K 5/167; H02K 5/20; H02K 5/207; H02K 9/06
See application file for complete search history.

(56) References Cited

U.S. PATENT DOCUMENTS

2019/0273421 A1\* 9/2019 Velderman ........... H02K 11/215
2022/0345003 A1\* 10/2022 Fukuda ................. H02K 11/33

FOREIGN PATENT DOCUMENTS

CN 210744992 U \* 6/2020

OTHER PUBLICATIONS

CN-210744992-U, all pages (Year: 2019).\*

\* cited by examiner

*Primary Examiner* — Naishadh N Desai
(74) *Attorney, Agent, or Firm* — JEEN IP LAW, LLC

(57) ABSTRACT

The present application provides a new type of brushless high speed motor, in which the integrated shell and air duct are separately fixed to the outside of the inner hole column, the material of the air duct and the outer shell is BMC, and the material of the inner hole column is metal. The two parts are combined and configured to be made of different materials, which can effectively buffer and reduce the resonance point of the motor, and reduce the noise caused by the high speed rotation of the motor. In addition, the housing is configured as a split type, and the air duct and shell can be directly fixed outside the inner hole column by BMC injection molding, which reduces the processing technology, reduces the burr of the housing. A grounding post is provided on the outside of the stator package for grounding.

8 Claims, 6 Drawing Sheets

BRUSHLESS HIGH SPEED MOTOR

CROSS-REFERENCE TO RELATED APPLICATIONS

This application claims priority to Chinese Utility Application No. 202222779006.6, filed on Oct. 21, 2022. The disclosures of these applications are incorporated herein for all purposes by reference in their entirety.

TECHNICAL FIELD

The present application relates to the field of motor technology, in particular to a novel brushless high speed motor.

BACKGROUND

High-speed brushless motor refers to a brushless motor with a speed of about 100,000 revolutions. This motor has the characteristics of small size, high speed, strong wind, low noise, and long life. Because of the high speed of this motor, the precision requirements for each component of the motor are very high. As an important part of the high-speed brushless motor, the housing is the guarantee of the air volume and pressure and the sound of the motor, so there are high requirements for the material, processing method and precision of the housing.

At present, the use of such housings on the market is completed by CNC machining after the mold is made of zinc alloy material (ZA8); As shown in the patent publication CN106877556A, the housing is a zinc frame structure in which the housing, the air duct, and the inner hole are integrated. Although this material and processing method can achieve high precision and meet the performance requirements of the motor, it is more complicated and inefficient due to the integrated structure. Moreover, the integrated structure does not have a good buffer for the resonance of the internal motor components, which is prone to the problem of excessive noise caused by the vibration transmitted by the housing.

Also, most of the high-speed brushless motors on the market today are high-voltage and need to be grounded. Most of these motors place the ground wire on the housing, which will cause an extra ground wire for the motor, which will have a certain impact on the design of the motor's air outlet.

Therefore, it is necessary to further design the structure of the brushless high-speed motor to solve the above-mentioned problems.

SUMMARY

In view of this, the present application provides a new type of brushless high-speed motor. Aiming at the problems of the prior art, a split housing, a grounding post, and a clearance elastic wave pad adjustment structure are designed to solve the existing technical problems.

The purpose of this application is achieved through the following technical solutions:

A new type of brushless high speed motor, comprising a cylindrical air duct shell, a stator assembly fixed on an upper part of an inner hole of the cylindrical air duct shell, and a rotating shaft fixed on a lower part of the inner hole of the cylindrical air duct shell through an upper bearing and a lower bearing, wherein the upper bearing and the lower bearing are fixed on a lower part of the rotating shaft, after an upper part of the rotating shaft is fixed with a magnetic ring, it extends into the inner cavity in the middle of the stator assembly together with the magnetic ring, and a bottom of the lower part of the rotating shaft is fixedly provided with fan blades, an upper side of the stator assembly is fixedly provided with an adapter plate and is electrically connected to it, and an upper side of the adapter plate is fixedly provided with connection terminals and electrically connected to it, and the connection terminals can be connected to an external control power supply for power supply, wherein the cylindrical air duct shell is configured as a split type, which comprises an inner hole column, an air duct, and a shell, the shell is a cylindrical thin-walled structure, the air duct is integrated with the shell and is arranged on an inner surface of the shell, and the air duct is tightly fitted and fixedly installed on an outer surface of the inner hole column.

Further, the air duct is a vane extending from the shell to the inner hole column and arranged in an axial direction, and the number of the vanes is nine.

Further, the outer surface of the inner hole column is also provided with rubber storage grooves surrounding the inner hole column, and there are one or more rubber storage grooves.

Further, the material of the inner hole column is metal, the material of the air duct and the shell is BMC, and the air duct and the shell are directly integrally fixed by injection molding outside the inner hole column.

Further, the stator assembly comprises a stator package, a stator core, and a coil, the material of the stator package is plastic and directly injected and fixed on an outside of the stator core, the coil is wound on the corresponding winding post of the stator core, the coil is electrically connected to the adapter plate.

Further, a grounding column is also fixedly arranged on an outer side of the stator package, the top of the grounding column is electrically connected to the adapter plate, and the grounding column is electrically connected to a metal part of the cylindrical air duct shell.

Further, the first implementation is, two concave fixed blocks are also arranged between the upper bearing and the lower bearing, and the two concave fixed blocks are movably sleeved on the rotating shaft, and the groove surfaces of the two concave fixed blocks are opposite to a center direction between the upper bearing and the lower bearing, wherein, an elastic wave pad sleeved on the rotating shaft is movably arranged in the middle of the grooves of the two concave fixed blocks, and the number of the elastic wave pads is one or more, the two concave fixing blocks are respectively pressed against the outer rings of the upper bearing and the lower bearing on the outside after being supported by the elastic wave pad, an outer side of the upper bearing is also provided with an upper bearing sleeve, and the upper bearing sleeve is sleeved on the outer side of the upper bearing in a tightly fitting and covering manner, an outer side of the lower bearing is also provided with a lower bearing sleeve, and the lower bearing sleeve is sleeved on the outer side of the lower bearing in a tightly fitting and covering manner.

Further, the second implementation is, a bushing, an upper gasket, an upper wave pad, a lower gasket, and a lower wave pad are also arranged between the upper bearing and the lower bearing, the bushing is fixed on the rotating shaft and against the upper bearing and the lower bearing up and down, and a protruding limiting step is set in the middle of the bushing, the upper gasket is sleeved on the upper side of the limiting step of the bushing and located at the lower side of the upper bearing, the upper wave gasket is sleeved on the upper side of the limiting step of the bushing and located at the lower side of the upper gasket, and after the upper gasket is resisted by the upper wave pad, it is against the outer ring of the upper bearing;

the lower gasket is sleeved on the lower side of the limiting step of the bushing and located at the upper side of the lower bearing, the lower wave gasket is sleeved on the lower side of the limiting step of the bushing and located at the upper side of the lower gasket, and after the lower gasket is resisted by the lower wave pad, it is against the outer ring of the lower bearing;

a bearing sleeve is also arranged outside the upper bearing and the lower bearing, and the bearing sleeve is sleeved on the outer side of the upper bearing and the lower bearing in a tightly fitting and covering manner.

Further, a third implementation is, an adjustment spring is further arranged between the upper bearing and the lower bearing, and the adjustment spring is movably sleeved on the rotating shaft, and an upper and lower ends of the adjustment spring are against the outer rings of the upper bearing and the lower bearing respectively.

The beneficial effect of the application is: In this application, the housing of the high-speed motor is designed separately, in which the integrated shell and air duct are separately fixed to the outside of the inner hole column, the material of the air duct and the outer shell is BMC, and the material of the inner hole column is metal. The two parts are combined and configured to be made of different materials, which can effectively buffer and reduce the resonance point of the motor, and reduce the noise caused by the high speed rotation of the motor. In addition, the housing is configured as a split type, and the air duct and shell can be directly fixed outside the inner hole column by BMC injection molding, which reduces the processing technology, reduces the burr of the housing, and improves the sound of the motor.

A grounding column is arranged on the outside of the stator package to ground, which not only makes assembly more convenient, but also does not affect the airflow of the motor.

The elastic wave pad replaces the spring to adjust the axial clearance. Each layer of the multi-layer elastic wave pad is designed separately, which has a longer service life and does not require tooling and fixtures. It is easier to install the single-piece directly, and the single-piece design of the elastic wave pad reduces the stress dislocation of the spring coil and other problems caused by the clearance and noise. Alternatively, by adopting the traditional commonly used spring adjustment method, the production and assembly methods do not need to be redesigned, and it is convenient to use in combination with other improved methods.

REFERENCE SIGNS

1. Cylindrical air duct shell, 2. Stator assembly, 3. Upper bearing, 4. Lower bearing, 5. Rotating shaft, 6. Magnetic ring, 7. Fan blade, 8. Adapter plate, 9. connection terminal, 101. Inner hole column, 102. Air duct, 103. Shell, 104. Vane, 105. Rubber storage groove, 201. Stator package, 202. Stator core, 203. Coil, 204. Grounding column, 10. Concave fixed block, 11. Groove, 12. Elastic wave pad, 13. Upper bearing sleeve, 14. Lower bearing sleeve, 15. Bushing, 16. Upper gasket, 17. Upper wave pad, 18. Lower gasket, 19. Lower wave pad, 20. Limiting step, 21. Bearing sleeve, 22. Adjustment spring.

DETAILED DESCRIPTION

Embodiments of the present disclosure will be described in detail below in conjunction with the accompanying drawings.

Embodiments of the present disclosure are described below through specific examples, and those skilled in the art can easily understand other advantages and effects of the present disclosure from the contents disclosed in this specification. Apparently, the described embodiments are only some of the embodiments of the present disclosure, not all of them. The present disclosure can also be implemented or applied through different specific implementation modes, and various modifications or changes can be made to the details in this specification based on different viewpoints and applications without departing from the spirit of the present disclosure. It should be noted that, in the case of no conflict, the following embodiments and features in the embodiments can be combined with each other. Based on the embodiments in the present disclosure, all other embodiments obtained by persons of ordinary skill in the art without making creative efforts belong to the protection scope of the present disclosure.

Figure 1:
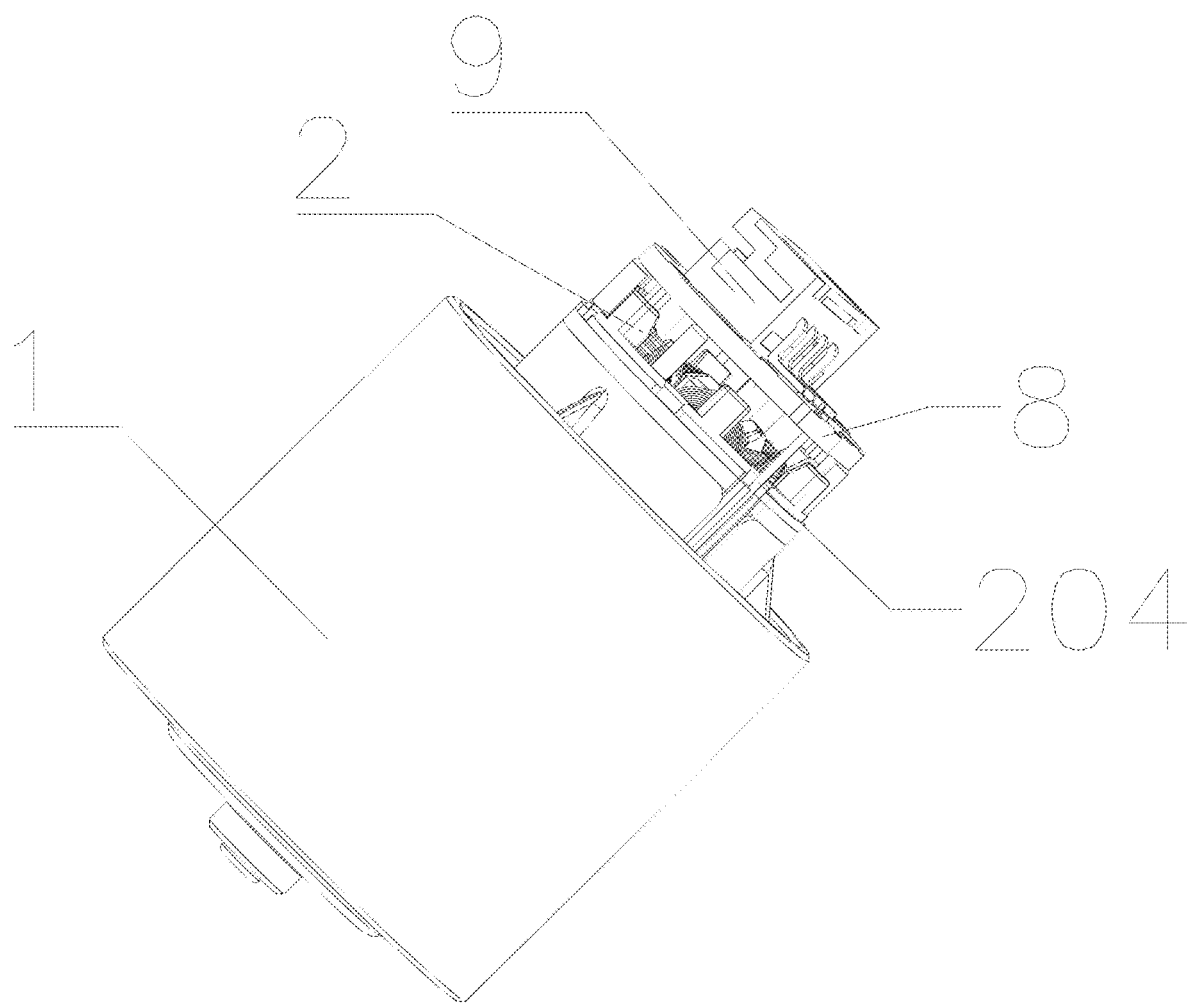
FIG. 1 is the schematic diagram of the novel brushless high-speed motor according to the present application.
Figure 2:
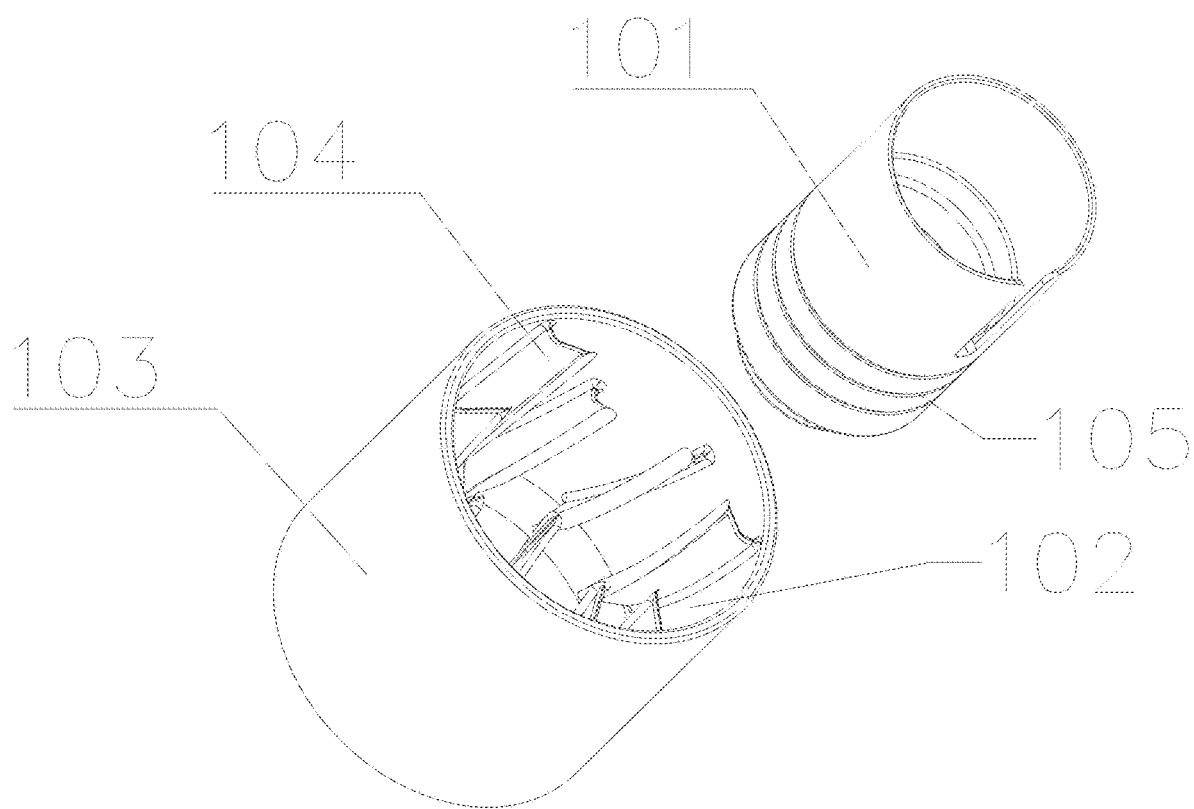
FIG. 2 is a schematic diagram of the disassembled cylindrical air duct shell according to the present application.

In order to reduce the processing technology, improve the sound of the motor, the stress dislocation of the spring coil and other problems caused by abnormal noise, the specific content of this application is as follows:

As shown in FIG. 1 and FIG. 2, the embodiment of the present application is a new type of brushless high-speed motor, comprising a cylindrical air duct shell 1, a stator assembly 2 fixed on an upper part of an inner hole of the cylindrical air duct shell 1, and a rotating shaft 5 fixed on a lower part of the inner hole of the cylindrical air duct shell 1 through an upper bearing 3 and a lower bearing 4, wherein the upper bearing 3 and the lower bearing 4 are fixed on a lower part of the rotating shaft 5, after an upper part of the rotating shaft 5 is fixed with a magnetic ring 6, it extends into the inner cavity in the middle of the stator assembly 2 together with the magnetic ring, and a bottom of the lower part of the rotating shaft 5 is fixedly provided with fan blades 7, an upper side of the stator assembly 2 is fixedly provided with an adapter plate 8 and is electrically connected to it, and an upper side of the adapter plate 8 is fixedly provided with connection terminals 9 and electrically connected to it, and the connection terminals 9 can be connected to an external control power supply for power supply. This is the basic structure of a brushless high-speed motor.

Importantly, the cylindrical air duct shell 1 is configured as a split type, which comprises an inner hole column 101, an air duct 102, and a shell 103, the shell 103 is a cylindrical thin-walled structure, the air duct 102 is integrated with the shell 103 and is arranged on an inner surface of the shell 103, and the air duct 102 is tightly fitted and fixedly installed on an outer surface of the inner hole column 101.

The air duct 103 is a vane 104 extending from the shell 103 to the inner hole column and arranged in an axial direction, and the number of the vanes 104 is nine.

The outer surface of the inner hole column 101 is also provided with rubber storage grooves 105 surrounding the inner hole column, and there are one or more rubber storage grooves 105, for further fixing the air duct 102 and the inner hole column 101, and the injection molding fixation is firmer and more reliable.

More specifically, the material of the inner hole column 101 is metal, the material of the air duct 102 and the shell 103 is BMC, and the air duct 102 and the shell 103 are directly integrally fixed by injection molding outside the inner hole column 101.

With such a design, the integrated shell 103 and air duct 102 are separately fixed to the outside of the inner hole column 101, the material of the air duct 102 and the outer shell 103 is BMC, and the material of the inner hole column 101 is metal. The two parts are combined and configured to be made of different materials, which can effectively buffer and reduce the resonance point of the motor, and reduce the noise caused by the high speed rotation of the motor. In addition, the split design of the housing avoids the disadvantages of slow efficiency and high manufacturing cost caused by integral die-casting of zinc alloy materials and then CNC processing, and the air duct 102 and shell 103 can be directly fixed outside the inner hole column 101 by BMC injection molding, which reduces the processing technology, reduces the burr of the housing, and improves the sound of the motor.

Figure 3:
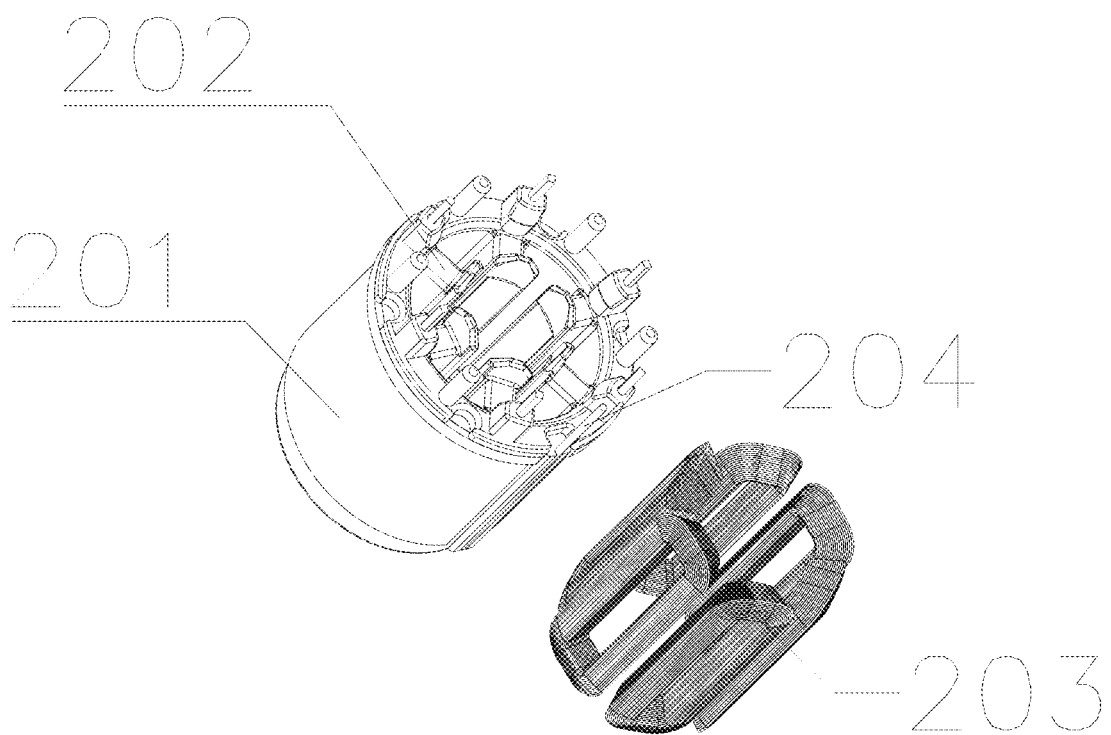
FIG. 3 is a schematic diagram of the disassembled stator assembly according to the present application.

As shown in FIG. 3, more specifically, the stator assembly 2 comprises a stator package 201, a stator core 202, and a coil 203, the material of the stator package 201 is plastic and directly injected and fixed on an outside of the stator core 202, the coil 203 is wound on the corresponding winding post of the stator core 202, the coil 203 is electrically connected to the adapter plate 8 for operating with power supply.

A grounding column 204 is also fixedly arranged on an outer side of the stator package 201, the top of the grounding column 204 is electrically connected to the adapter plate 8, and the grounding column 204 is electrically connected to a metal part of the cylindrical air duct shell 1. In this way, direct grounding is realized, and there is no need to arrange a grounding wire on the cylindrical air duct shell 1, which makes assembly more convenient and will not affect the air output of the motor.

In addition, there are three implementation methods for the axial clearance adjustment structure of the bearing of the rotating shaft of the motor as follows:

Embodiment 1

Figure 4:
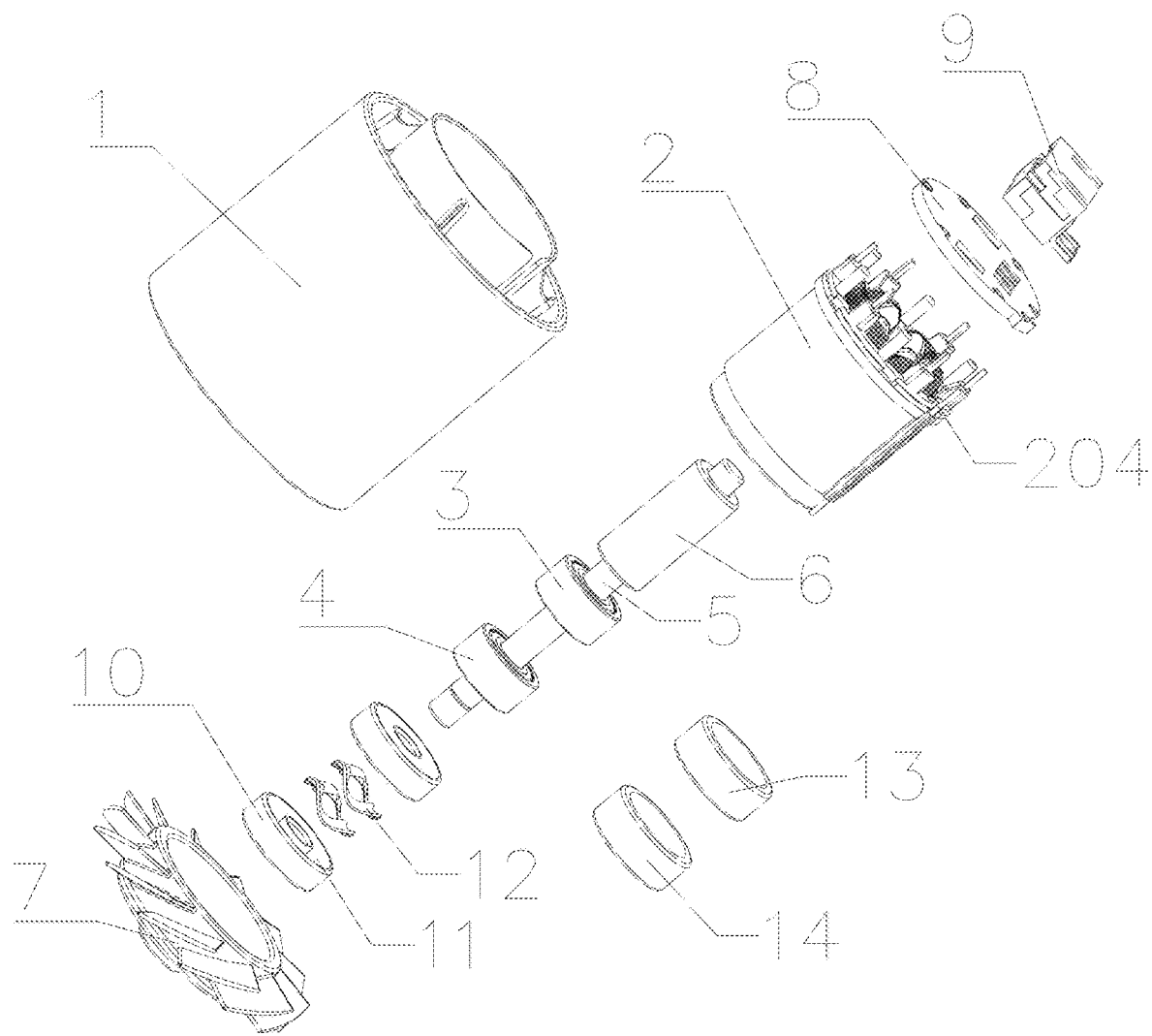
FIG. 4 is a schematic diagram of the disassembled brushless high-speed motor according to Embodiment 1 of the present application.

As shown in FIG. 4, two concave fixed blocks 10 are also arranged between the upper bearing 3 and the lower bearing 4, and the two concave fixed blocks 10 are movably sleeved on the rotating shaft 5, and the groove surfaces of the two concave fixed blocks 10 are opposite to a center direction between the upper bearing 3 and the lower bearing 4, wherein, an elastic wave pad 12 sleeved on the rotating shaft 5 is movably arranged in the middle of the grooves of the two concave fixed blocks 10, and the number of the elastic wave pads 12 is one or more, the two concave fixing blocks 10 are respectively pressed against the outer rings of the upper bearing 3 and the lower bearing 4 on the outside after being supported by the elastic wave pad 12.

With such a design, one or more layers of elastic wave pads 12 are arranged in the middle of the grooves 11 of the two concave fixed blocks 10, and the outer rings of the upper bearing 3 and the lower bearing 4 are respectively held against by the elastic wave pads 12, and the axial clearance between the outer rings and the inner rings of the bearings are adjusted, instead of the spring adjustment. Each layer of the multi-layer elastic wave pad 12 is individually designed without any fixtures. It is easier to install the single-piece directly, and the single-piece design of the wave pad reduces the problem of abnormal sound and noise caused by the stress misalignment of the spring ring. Through the groove 11 of the concave fixed block 10, the concentricity accuracy of the rotating shaft 5, the bearing and the multi-layer elastic wave pad can be improved, and the vibration noise of the motor can be reduced;

An outer side of the upper bearing 3 is also provided with an upper bearing sleeve 13, and the upper bearing sleeve 13 is sleeved on the outer side of the upper bearing 3 in a tightly fitting and covering manner, an outer side of the lower bearing 4 is also provided with a lower bearing sleeve 14, and the lower bearing sleeve 14 is sleeved on the outer side of the lower bearing 4 in a tightly fitting and covering manner, the main function is to facilitate installation and protect the bearing.

Embodiment 2

Figure 5:
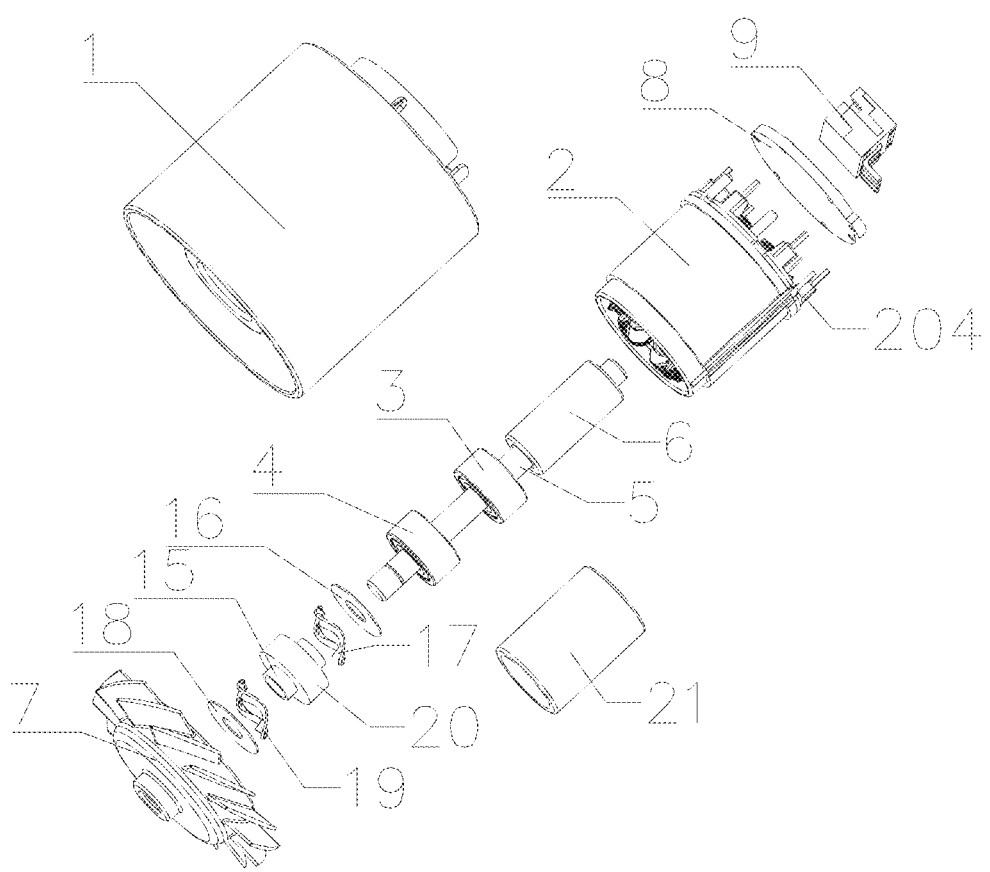
FIG. 5 is a schematic diagram of the disassembled brushless high-speed motor according to the Embodiment 2 of the present application.

As shown in FIG. 5, a bushing 15, an upper gasket 16, an upper wave pad 17, a lower gasket 18, and a lower wave pad 19 are also arranged between the upper bearing 3 and the lower bearing 4, the bushing 15 is fixed on the rotating shaft 5 and against the upper bearing 3 and the lower bearing 4 up and down, and a protruding limiting step 20 is set in the middle of the bushing 15, the upper gasket 16 is sleeved on the upper side of the limiting step 20 of the bushing 15 and located at the lower side of the upper bearing 3, the upper wave gasket 17 is sleeved on the upper side of the limiting step 20 of the bushing 15 and located at the lower side of the upper gasket 16, and after the upper gasket 16 is resisted by the upper wave pad 17, it is against the outer ring of the upper bearing 3;

The lower gasket 18 is sleeved on the lower side of the limiting step 20 of the bushing 15 and located at the upper side of the lower bearing 4, the lower wave gasket 19 is sleeved on the lower side of the limiting step 20 of the bushing 15 and located at the upper side of the lower gasket 18, and after the lower gasket 18 is resisted by the lower wave pad 19, it is against the outer ring of the lower bearing 4;

A bearing sleeve 21 is also arranged outside the upper bearing 3 and the lower bearing 4, and the bearing sleeve 21 is sleeved on the outer side of the upper bearing 3 and the lower bearing 4 in a tightly fitting and covering manner.

With such a design, the bushing 15 is sleeved with upper and lower wave pads. The upper and lower wave pads replace the springs against the upper and lower gaskets and then against the outer rings of the upper bearing 3 and the lower bearing 4 to adjust the axial clearance between the outer ring and the inner ring of the bearing. The installation of the single piece-wave pad is easier, and the elastic design of the two sections is separated, and the service life is longer. The single-piece design of the wave pad reduces the problem of abnormal sound and noise caused by the stress dislocation of the spring coil; At the same time, with the design of the bearing sleeve 21, the bushing 15 and the bearing sleeve 21 can well fix the upper and lower wave pads and the upper and lower bearings, which can greatly improve the concentricity accuracy of the rotating shaft 5, the upper and lower bearings, and the upper and lower wave pads, and reduce the vibration noise of the motor.

Embodiment 3

Figure 6:
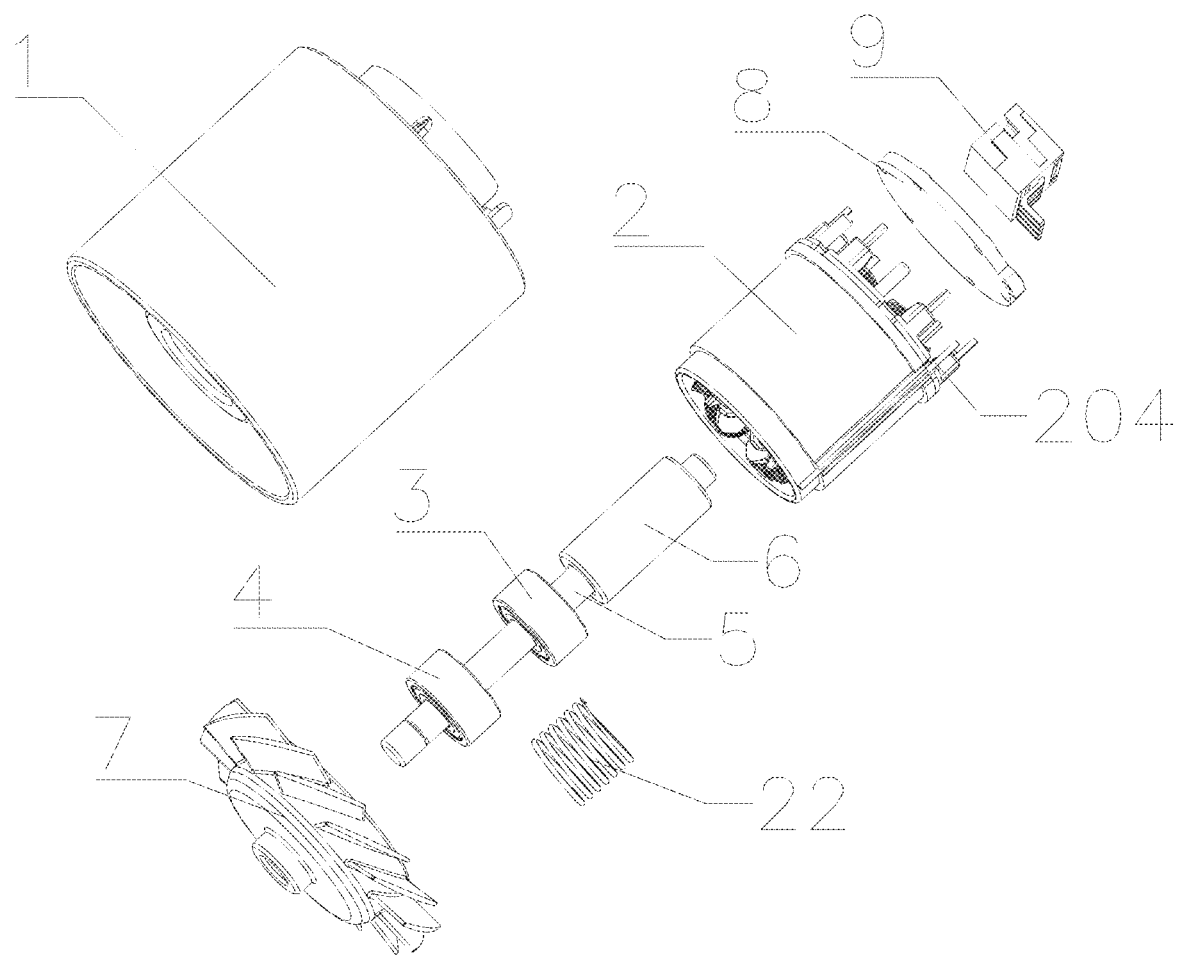
FIG. 6 is a schematic diagram of the disassembled brushless high-speed motor according to the Embodiment 3 of the present application.

As shown in FIG. 6, an adjustment spring 22 is further arranged between the upper bearing 3 and the lower bearing 4, and the adjustment spring 22 is movably sleeved on the rotating shaft 5, and an upper and lower end of the adjustment spring are against the outer rings of the upper bearing 3 and the lower bearing 4 respectively. To adjust the axial clearance between the outer ring and the inner ring of the bearing, the traditional and commonly used spring adjustment method is adopted. The production and assembly methods do not need to be redesigned, and it is convenient to use in combination with other improved methods.

The above is only to illustrate the implementation of the application, and is not intended to limit the application. For those skilled in the art, any modification, equivalent replacement, improvement, etc. within the spirit and principles of the application without creative work shall be included in the protection scope of the application.

What is claimed is:

1. A new-type-of-brushless high speed motor, comprising a cylindrical air duct shell, a stator assembly fixed on an upper part of an inner hole of the cylindrical air duct shell, and a rotating shaft fixed on a lower part of the inner hole of the cylindrical air duct shell through an upper bearing and a lower bearing,
   wherein the upper bearing and the lower bearing are fixed on a lower part of the rotating shaft, after an upper part of the rotating shaft is fixed with a magnetic ring, it extends into the inner cavity in a middle of the stator assembly together with the magnetic ring, and a bottom of the lower part of the rotating shaft is fixedly provided with fan blades,
   an upper side of the stator assembly is fixedly provided with an adapter plate and is electrically connected to it, and an upper side of the adapter plate is fixedly provided with connection terminals and electrically connected to it, and the connection terminals are connected to an external control power supply for power supply,
   wherein the cylindrical air duct shell is configured as a split type, which comprises an inner hole column, an air duct, and a shell,
   the shell is a cylindrical thin-walled structure, the air duct is integrated with the shell and is arranged on an inner surface of the shell, and the air duct is tightly fitted and fixedly installed on an outer surface of the inner hole column;
   wherein the outer surface of the inner hole column is further provided with rubber storage grooves surrounding the inner hole column, and there are one or more rubber storage grooves.

2. The brushless high speed motor according to claim 1, wherein the air duct is a vane extending from the shell to the inner hole column and arranged in an axial direction, and the number of the vanes is nine.

3. The brushless high speed motor according to claim 1, wherein the material of the inner hole column is metal, the material of the air duct and the shell is BMC, and the air duct and the shell are directly integrally fixed by injection molding outside the inner hole column.

4. The brushless high speed motor according to claim 1, wherein the stator assembly comprises a stator package, a stator core, and a coil,
   the material of the stator package is plastic and directly injected and fixed on an outside of the stator core,
   the coil is wound on a corresponding winding post of the stator core, the coil is electrically connected to the adapter plate.

5. The brushless high speed motor according to claim 4, wherein a grounding column is further fixedly arranged on an outer side of the stator package,
   a top of the grounding column is electrically connected to the adapter plate, and the grounding column is electrically connected to a metal part of the cylindrical air duct shell.

6. The brushless high speed motor according to claim 1, wherein two concave fixed blocks are arranged between the upper bearing and the lower bearing, and the two concave fixed blocks are movably sleeved on the rotating shaft, and the groove surfaces of the two concave fixed blocks are opposite to a center direction between the upper bearing and the lower bearing,
   wherein, an elastic wave pad sleeved on the rotating shaft is movably arranged in a middle of the grooves of the two concave fixed blocks, and the number of the elastic wave pads is one or more,
   the two concave fixing blocks are respectively pressed against outer rings of the upper bearing and the lower bearing on the outside after being supported by the elastic wave pad,
   an outer side of the upper bearing is further provided with an upper bearing sleeve, and the upper bearing sleeve is sleeved on the outer side of the upper bearing in a tightly fitting and covering manner,
   an outer side of the lower bearing is further provided with a lower bearing sleeve, and the lower bearing sleeve is sleeved on the outer side of the lower bearing in a tightly fitting and covering manner.

7. The brushless high speed motor according to claim 1, wherein a bushing, an upper gasket, an upper wave pad, a lower gasket, and a lower wave pad are also arranged between the upper bearing and the lower bearing,
   the bushing is fixed on the rotating shaft and against the upper bearing and the lower bearing up and down, and a protruding limiting step is set in a middle of the bushing,
   the upper gasket is sleeved on an upper side of the limiting step of the bushing and located at a lower side of the upper bearing,
   the upper wave gasket is sleeved on the upper side of the limiting step of the bushing and located at a lower side of the upper gasket, and after the upper gasket is resisted by the upper wave pad, it is against an outer ring of the upper bearing;
   the lower gasket is sleeved on a lower side of the limiting step of the bushing and located at an upper side of the lower bearing, a lower wave gasket is sleeved on the lower side of the limiting step of the bushing and located at an upper side of the lower gasket, and after the lower gasket is resisted by the lower wave pad, it is against an outer ring of the lower bearing;
   a bearing sleeve is arranged outside the upper bearing and the lower bearing, and the bearing sleeve is sleeved on the outer side of the upper bearing and the lower bearing in a tightly fitting and covering manner.

8. The brushless high speed motor according to claim 1, wherein an adjustment spring is further arranged between the upper bearing and the lower bearing, and the adjustment spring is movably sleeved on the rotating shaft, and an upper end and a lower end of the adjustment spring are against the outer rings of the upper bearing and the lower bearing respectively.

\* \* \* \* \*